United States Patent
Pleiman et al.

(12)

(10) Patent No.: US 12,444,274 B2
(45) Date of Patent: Oct. 14, 2025

(54) VIRTUAL SPORTS BOOK SYSTEMS AND METHODS

(71) Applicant: DISH Network L.L.C., Englewood, CO (US)

(72) Inventors: Eric Pleiman, Centennial, CO (US); Jesus Flores Guerra, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 319 days.

(21) Appl. No.: 18/091,876

(22) Filed: Dec. 30, 2022

(65) Prior Publication Data

US 2024/0221468 A1  Jul. 4, 2024

(51) Int. Cl.
| | |
|---|---|
| *G07F 17/32* | (2006.01) |
| *G02B 27/01* | (2006.01) |
| *G06Q 50/34* | (2012.01) |
| *H04N 21/2187* | (2011.01) |

(52) U.S. Cl.
CPC ..... *G07F 17/3288* (2013.01); *G02B 27/0172* (2013.01); *G06Q 50/34* (2013.01); *H04N 21/2187* (2013.01)

(58) Field of Classification Search
CPC ............ G07F 17/3288; G02B 27/0172; G06Q 50/34; H04N 21/2187
See application file for complete search history.

(56) References Cited

U.S. PATENT DOCUMENTS

| | | | |
|---|---|---|---|
| 2021/0368227 A1* | 11/2021 | Depies ............... | H04N 21/4316 |
| 2022/0108586 A1* | 4/2022 | Khosla ............... | G07F 17/3288 |
| 2023/0124722 A1* | 4/2023 | Polson ............... | H04N 21/4781 |
| | | | 725/37 |

* cited by examiner

*Primary Examiner* — Kang Hu
*Assistant Examiner* — Ross A Williams
(74) *Attorney, Agent, or Firm* — Perkins Coie LLP (57) ABSTRACT

A virtual sports betting system, including: one or more processors; and one or more memory devices having stored thereon instructions that when executed by the one or more processors cause the one or more processors to: receive a sports category selection; determine a set of live broadcast events corresponding to the selected sports category; receive one or more data streams corresponding to each live broadcast event; display each of the data streams on a head mounted display (HMD); retrieve available wager information corresponding to each of the set of live broadcast events from one or more third-party betting platforms; and display the retrieved wager information on the HMD adjacent the display of the associated data stream.

20 Claims, 9 Drawing Sheets

VIRTUAL SPORTS BOOK SYSTEMS AND METHODS

BACKGROUND

As more states adopt legislation to allow on-line sports betting, a viewer in those states can wager on multiple games across different sports, each of which the viewer would like to watch in real time. Unfortunately, many of these games or events will be broadcast at overlapping times requiring the viewer to manually switch between multiple channels. Furthermore, it can be cumbersome to search for and retrieve wager information for available sports bets for each event that is taking place at any given time.

SUMMARY

In some aspects, the techniques described herein relate to a virtual sports betting system, including: one or more processors; and one or more memory devices having stored thereon instructions that when executed by the one or more processors cause the one or more processors to: receive a sports category selection; determine a set of live broadcast events corresponding to the selected sports category; receive one or more data streams corresponding to each live broadcast event; display each of the data streams on a head mounted display (HMD); retrieve available wager information corresponding to each of the set of live broadcast events from one or more third-party betting platforms; and display the retrieved wager information on the HMD adjacent the display of the associated data stream.

In some aspects, the techniques described herein relate to a system, wherein each of the data streams is displayed on a virtual television in a virtual environment.

In some aspects, the techniques described herein relate to a system, further including instructions to output an audio signal for only the data stream corresponding to the virtual television a user is currently viewing.

In some aspects, the techniques described herein relate to a system, further including one or more tuners and instructions to tune the one or more tuners to a channel corresponding each live broadcast event.

In some aspects, the techniques described herein relate to a system, further including instructions to tune at least one of the one or more tuners to a first channel when a user moves the HMD to view a first virtual television and subsequently tuning the tuner to a second channel when the user moves the HMD to view a second virtual television.

In some aspects, the techniques described herein relate to a system, further including instructions to tune at least one of the one or more tuners to a first channel when a user moves the HMD to view a first direction in a virtual environment and subsequently tuning the tuner to a second channel when the user moves the HMD to view a second direction in the virtual environment.

In some aspects, the techniques described herein relate to a system, wherein receiving the sports category selection includes a user entering a virtual room corresponding to the category.

In some aspects, the techniques described herein relate to a system, further including instructions to receive wager selection information.

In some aspects, the techniques described herein relate to a system, further including instructions to prioritize the displayed data streams based on the received wager selection information.

In some aspects, the techniques described herein relate to a system, wherein retrieving the available wager information includes receiving available wager information from multiple third-party platforms and displaying the available wager information on the HMD for user comparison.

In some aspects, the techniques described herein relate to a method for displaying sports betting information in a virtual environment, the method including: receiving a sports category selection; determining a set of live broadcast events corresponding to the selected sports category; receiving one or more data streams corresponding to each live broadcast event; displaying each of the data streams on a head mounted display (HMD); retrieving available wager information corresponding to each of the set of live broadcast events from one or more third-party betting platforms; and displaying the retrieved wager information on the HMD adjacent the display of the associated data stream.

In some aspects, the techniques described herein relate to a method, wherein each of the data streams is displayed on a virtual television in a virtual environment.

In some aspects, the techniques described herein relate to a method, further including sending an instruction to output an audio signal for only the data stream corresponding to the virtual television a user is currently viewing.

In some aspects, the techniques described herein relate to a method, wherein the one or more data streams are received over a wireless connection.

In some aspects, the techniques described herein relate to a method, wherein the one or more data streams are received via a set-top-box.

In some aspects, the techniques described herein relate to a method, wherein receiving the sports category selection includes a user entering a virtual room corresponding to the category.

In some aspects, the techniques described herein relate to a method, wherein determining the set of live broadcast events includes verifying the user's authorization to view the corresponding data stream.

In some aspects, the techniques described herein relate to a method, further including receiving wager selection information.

In some aspects, the techniques described herein relate to a method, further including prioritizing the displayed data streams based on the received wager selection information.

In some aspects, the techniques described herein relate to a method, wherein retrieving the available wager information includes receiving available wager information from multiple third-party platforms and displaying the available wager information on the HMD for user comparison.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Viewers in those states that allow it, can wager on multiple games across different sports, each of which the viewer would like to watch in real time. Unfortunately, many of these games or events will be broadcast at overlapping times requiring the viewer to manually switch between multiple channels. Furthermore, it can be cumbersome to search and retrieve wager information for available sports bets for each event that is taking place at any given time. Disclosed herein are methods and systems for rendering a virtual sports book environment with live television events being displayed on multiple virtual displays within the virtual sportsbook environment akin to a sports book section of a casino. The events displayed in the virtual sports book can be based on e.g., programming available on a set-top-box (STB) or data stream(s) that are received over a wireless connection. In addition, the system gathers and displays wager information that is available for a user to place a bet for the various events displayed in the virtual environment.

Figure 1:
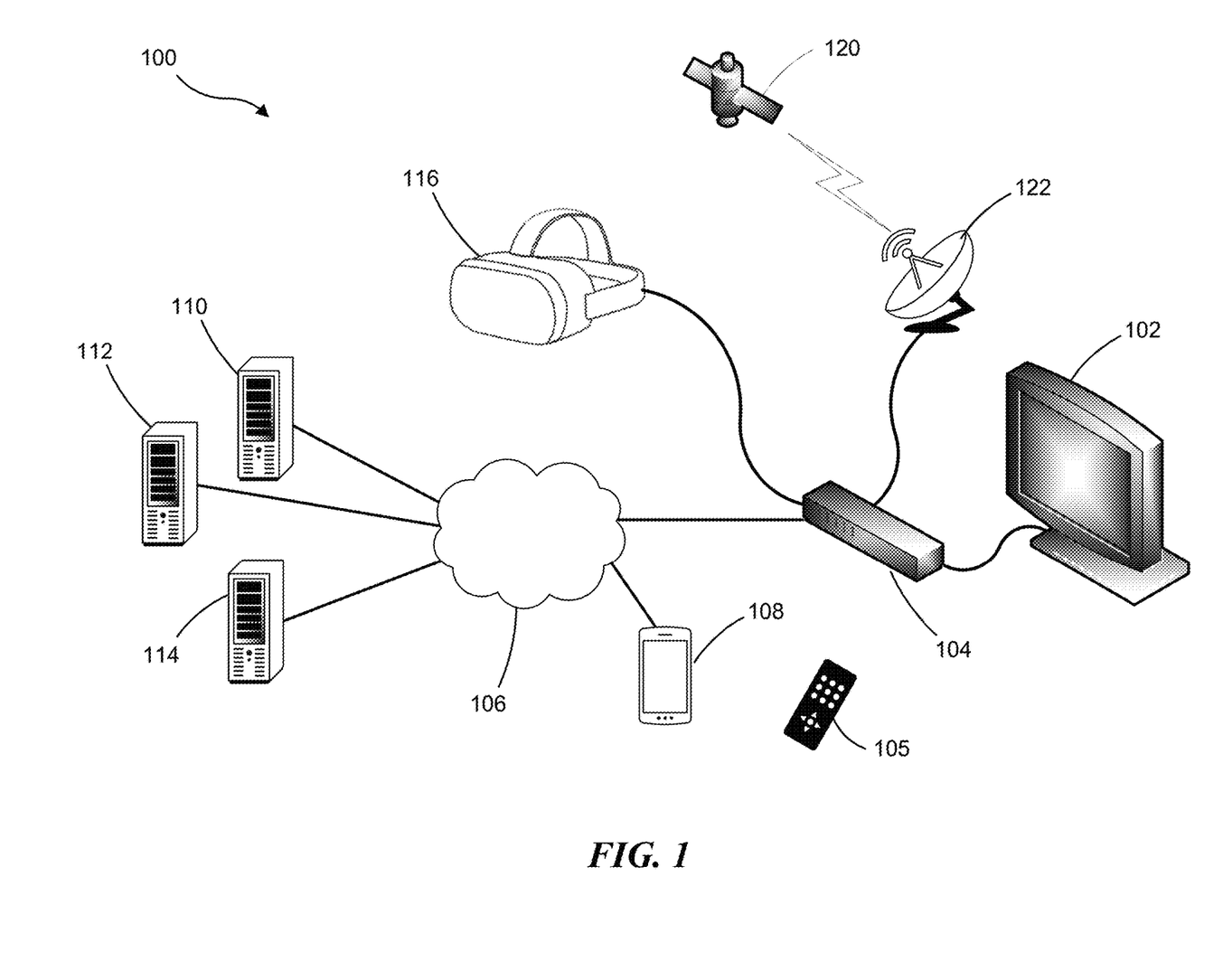
FIG. 1 illustrates an example simplified block diagram of a virtual sports betting system according to some embodiments of the disclosed technology.

FIG. 1 illustrates an example simplified block diagram of a system 100 for providing a virtual sports book environment. The system 100 can include, a television 102, a STB 104, a remote control 105, a controller 110, a virtual reality (VR) rendering system 112, a head mounted display 116 (HMD) (e.g., VR goggles), and optionally a cloud environment 106. The system 100 can also include or be in communication with one or more third party betting platforms 114. In some embodiments, the system 100 can include or be in communication with a user device 108. The user device 108 can be a desktop computer or a mobile device, such as a cellular telephone, a tablet computer, a smartwatch, or any other mobile device. While depicted separately, the STB 104, the controller 110, and the VR rendering system 112 can optionally be combined into a single STB or computer system. In some embodiments, the STB 104 can connect to HMD 116 with a wired or wireless connection.

In some embodiments, the VR rendering system 112 can handle rendering the virtual sportsbook environment and the live broadcast events on various virtual displays. The controller 110 can be configured to retrieve available wager information corresponding to each of the live broadcast events from the third-party betting platforms 114 and receive wager selection information from a user. In some embodiments, the controller 110 and/or the STB 104 can also verify the user's channel authorization as well as prioritize the displayed channels based on the received wager selection information. Systems for automatically selecting television channels based on wager information are described in U.S. Pat. No. 10,848,836, issued Nov. 24, 2020, the disclosure of which is incorporated herein by reference in its entirety.

In some examples, the STB 104 can be in communication with a satellite-based television distribution system via a satellite dish 122. Satellite-based television distribution systems often include one or more satellites 120 and satellite transmission equipment (not shown). Although the system is described with respect to satellite-based distribution system, cable, IP-based, wireless, and broadcast focused systems are also possible. Accordingly, in some embodiments a STB is not necessary to implement the disclosed technology. For example, controller 110 can include wireless capabilities (e.g., 4G, 5G, and the like) to receive one or more data streams corresponding to broadcast events. While only one satellite dish 122, STB 104, and display device 102 (collectively referred to as "user equipment") are illustrated, it should be understood that multiple (e.g., tens, thousands, millions of) instances and types of user equipment may receive data and television signals from satellite-based television distribution systems (e.g., satellite 120).

Figure 2:
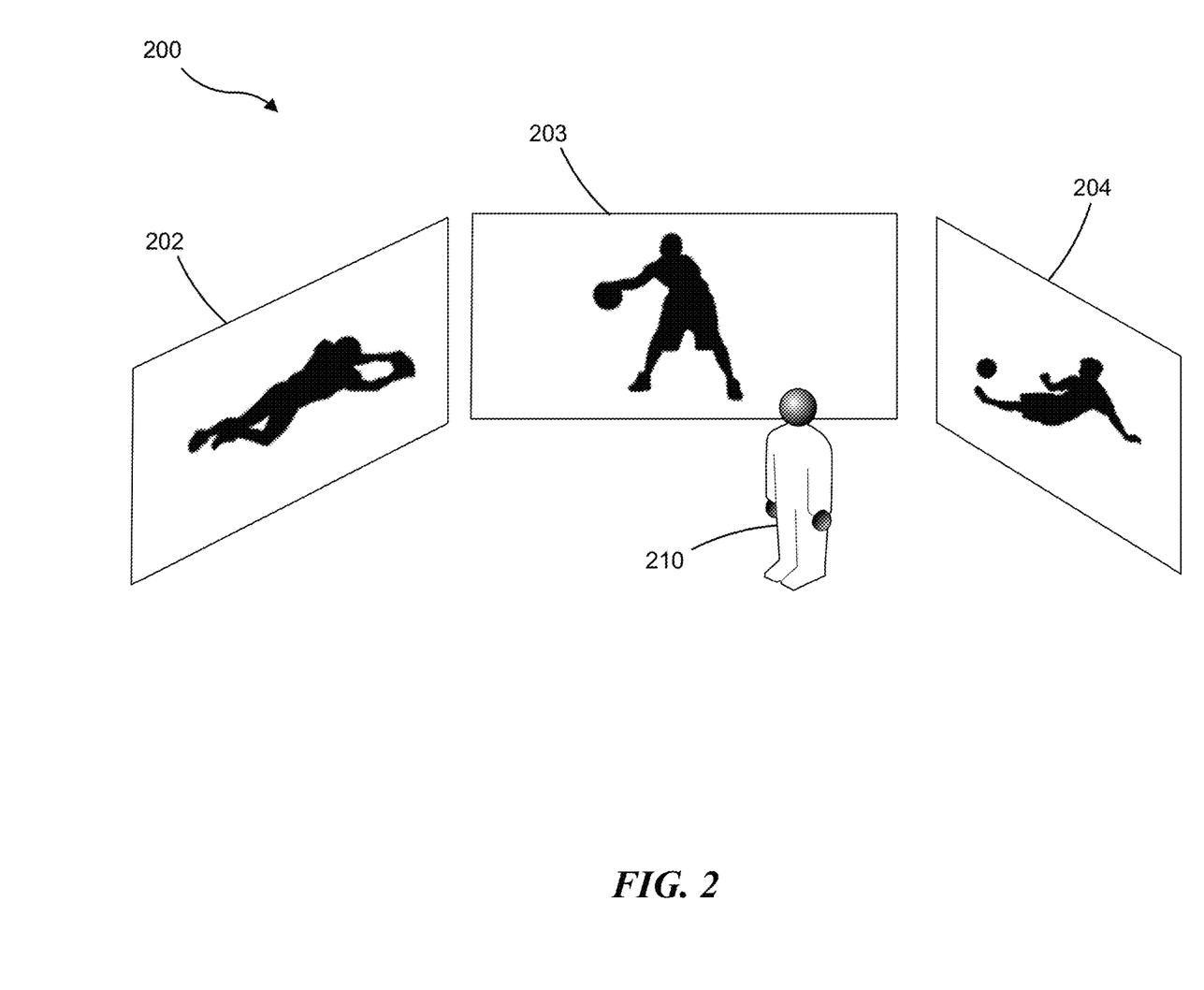
FIG. 2 illustrates a virtual reality sports betting environment according to some embodiments of the disclosed technology.

As shown in FIG. 2, the system 100 can render a virtual sports book environment 200 with live broadcast events being displayed on multiple virtual displays 202-204, e.g., virtual "TVs," within the virtual sportsbook environment 200 based on the programming available on the STB 104. For example, if a user has e.g., the ESPN package, various games from the ESPN channel would be available for display on virtual displays 202-204. If the user did not have access to a particular package, e.g., the Big Ten package, it would not allow the game to be displayed within the sportsbook environment 200. The user could change the live event/game on the different displays via a VR remote, via a real world remote (punching in a key sequence like #, * or a special sports book display button and then the display number to change the channel), or voice through a voice remote 105 (FIG. 1) or a paired microphone to the STB 104. Representative voice commands via e.g., Google home, Amazon echo, etc. can include, for example, "VR display #2 change to ESPN2" or "VR display change to Ohio State Football." In some embodiments, a user avatar 210 can walk around the sportsbook environment 200 to look at different live events or games playing on the virtual displays 202-204.

Figure 3:
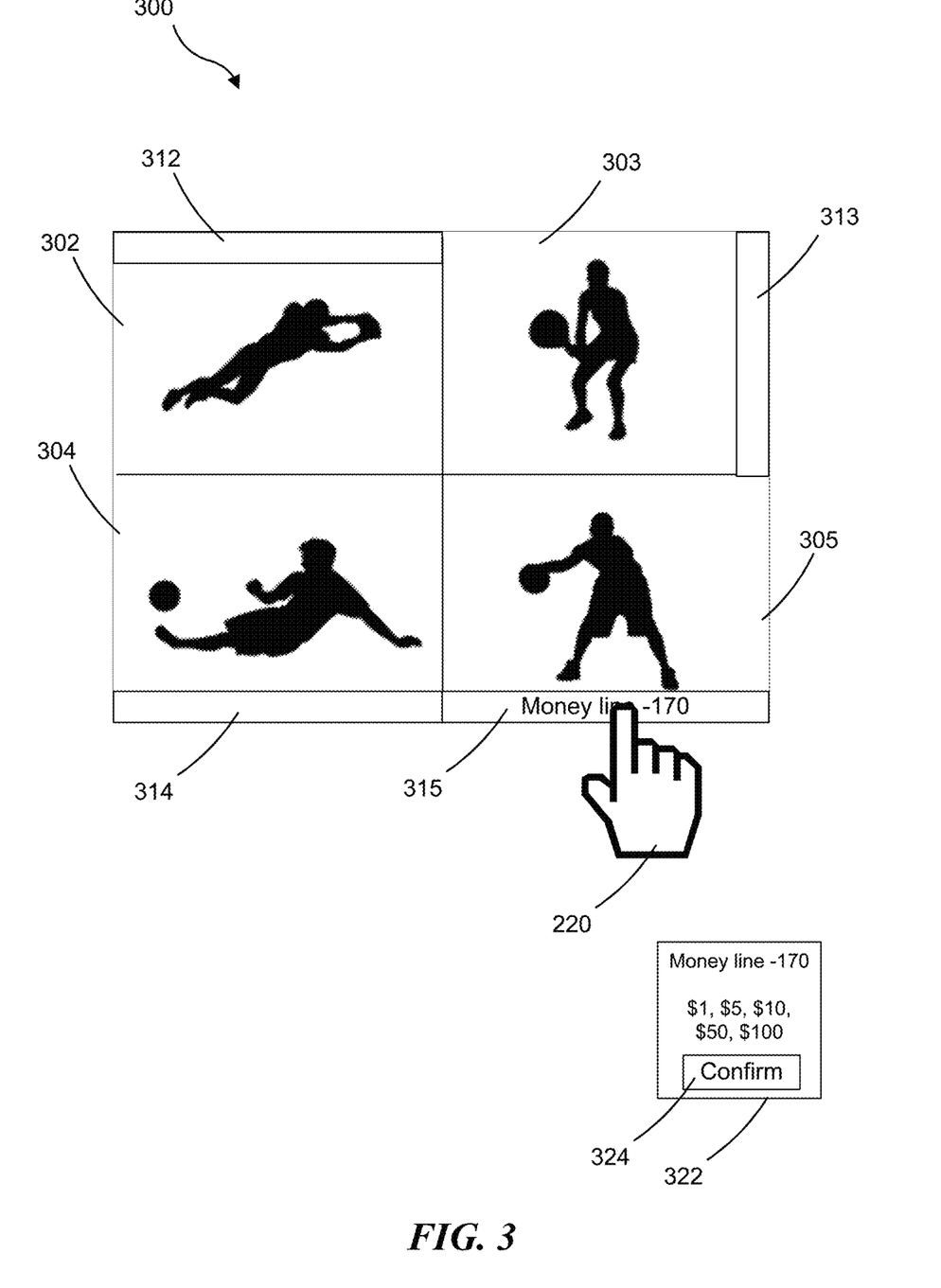
FIG. 3 illustrates a virtual multi-event display with corresponding available wager information according to some embodiments of the disclosed technology.

FIG. 3 illustrates a multi-view mode where multiple events can be displayed on the same virtual display 300. In some embodiments, the events are rendered on the virtual display to be top/bottom or left/right for a two game picture-in-picture (PIP) view. In the depicted embodiment, four or more events can be displayed on the virtual display 300 depending on the STBs video display capabilities (e.g., number of tuners). For example, STB 104 can have four or more tuners each capable of decoding a live broadcast event for display. Each event is displayed on a quadrant 302-305 of the virtual display 300. A corresponding wager line 312-315 can be rendered adjacent to each live event display on the side, top, or bottom of the multi event/game display as shown. In some embodiments, wager line settings can control where the wager lines are to be placed for each quadrant.

As noted above, the system 100 can be in communication with one or more third party betting platforms 114 (FIG. 1), such as e.g., Draftkings, theScore BET, Fandual, MGM, Fox Bet, etc. The system, e.g., controller 110, can be configured to gather live wager lines, for example and without limitation, prop bets, money lines, over/under lines, player props, and/or third pitch of at bat for e.g., Johnny Johnson (strike/foul, ball, in-play). These wager lines 312-315 can then be displayed next to, above, or below the corresponding virtual displays in real-time. In some embodiments, the system can receive available wager information from multiple third-party platforms and display the available wager information, including odds, for user comparison. In this way the user can easily review the odds for multiple types of bets from multiple betting platforms in order to shop for the best odds.

While watching the game on the virtual display 300 a user can place a wager on a specific line or prop bet by using their avatar to e.g., walk up to and/or reach out to touch the wager with the avatar's hand 220 to select the desired wager. The user can place pre-game wagers along with in-game live wagers. The user, via the avatar, can touch the line (e.g., money line—170) and then a bet slip 322 pops up with money line—170 and the user can be asked for the exact currency amount they wish to place on the wager. In some embodiments, there are predetermined amounts (e.g., $1, $5, $10, $50, $100) that pop up on the bet slip that the avatar hand 220 could push to bet, or the avatar could type in an amount they wish to wager via a virtual numerical pad on the VR bet slip or the user could use a remote/keyboard in the real world to type in a wager amount in the VR world for the avatar. After the amount of the wager is selected, a confirmation button 324 can populate to confirm that the user wants to place the wager before it is finalized. In some embodiments, the user can review open bet slips and settled bet slips. The avatar, for example, can scroll through the bet slips with the avatar swiping or touching them up/down or left/right, for example. In the real world the user can use a remote or keyboard to navigate through the bet slips to get to the one they want to review in the virtual environment. In some embodiments, a user can enter a bet slip review mode by entering a virtual room with the avatar or by reaching (e.g., selecting a button or icon) into a virtual pocket to pull out bet slips.

The system 100 can also be configured to suggest wagers based on past betting behavior. In some embodiments, every game watched and every wager placed by a user can be recorded it into a database to allow the system to predictively suggest wagers on future games or suggest types of games/events/teams based on the ones the user has watched in the past or similar events to be watched on the virtual displays. For example, if a user always watches and/or bets on a particular team (e.g., favorite team), the system can suggest watching an upcoming game featuring the favorite team. Similarly, the system can populate lines with betting options for that team. Once the virtual display is running, the live video displays and similar wagers that have been placed in the past can be displayed for that user to decide if they want to place that wager on that event. In some embodiments, the game and wager suggestions can be determined with a machine learning model that is trained on historical viewing and wagering patterns. The auto suggest events and auto suggest wagers can be a selectable feature of the system e.g., on/off.

Figure 4:
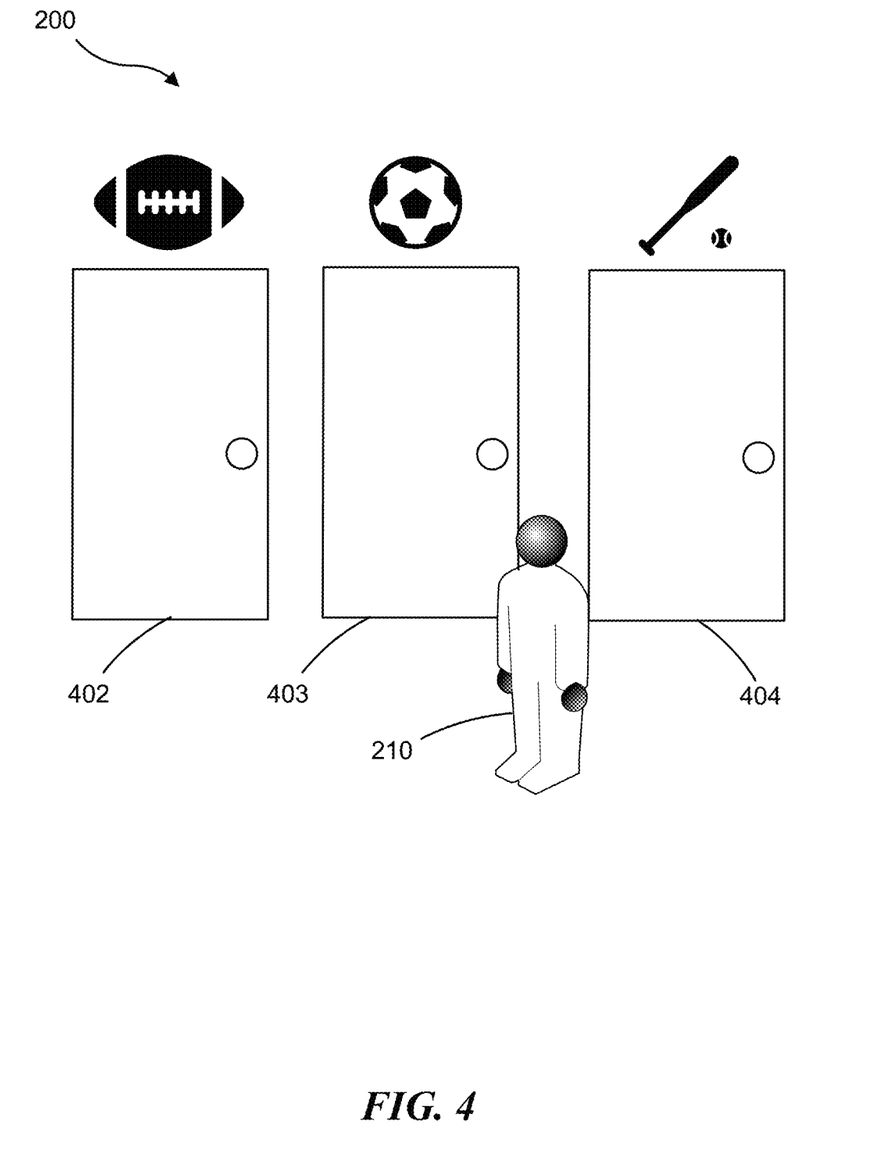
FIG. 4 illustrates virtual doorways corresponding to different sports categories according to some embodiments of the disclosed technology.

With reference to FIG. 4, in some embodiments, a user can configure the sports book virtual environment 200 to have doors 402-404 leading to themed display rooms. For example, the avatar 210 in the virtual sports book environment 200 can walk up to a virtual door 402 with a football above it or a football on the door and go inside the "football" room. All the displays in the virtual room can have different football games that are available on the STB 104. The wager lines can be displayed just like in the full sportsbook display 300 (FIG. 3). There can be many different virtual room doors to choose from depending which games/event are available on the STB 104 e.g., baseball, tennis, football, soccer, table tennis, golf, UFC, boxing, etc.

If a user has subscribed to e.g., the Big Ten package, ESPN, and/or Fox sports, all of those games can be displayed on a virtual display in the virtual sports book environment. If the user does not have access to a game, the display can be blank or black with the names of the two teams listed on the screen along with the wager line for that game. In some embodiments, there can be a button on the blacked out screen that the avatar could push to gain authorization to add the package to their subscription through their provider and the game could be accessed from within the sports book virtual environment 200, and the STB 104 would be authorized in the real world and they could watch the game in the sports book virtual environment 200 or on their real world television.

In some embodiments, a user can invite other users, e.g., friends, to watch the game with them in the sports book virtual environment 200. The system can perform an authorization check to determine whether the invited friend has access to the same games. If not, the invited friend's sports book virtual environment 200 would have the black screen with the names of the teams playing on the display that they are trying to watch on their HMD. The invited user would also have the option to upgrade their channel package through their television provider/streaming provider/content provider. The wager lines would still populate to the side of the display whether it be a black screen or the live game being displayed. Each user can have an avatar through which the users can talk with each other through real world microphones if they wished to have a conversation with the other invited user(s) in the sports book virtual environment 200.

Figure 5A:
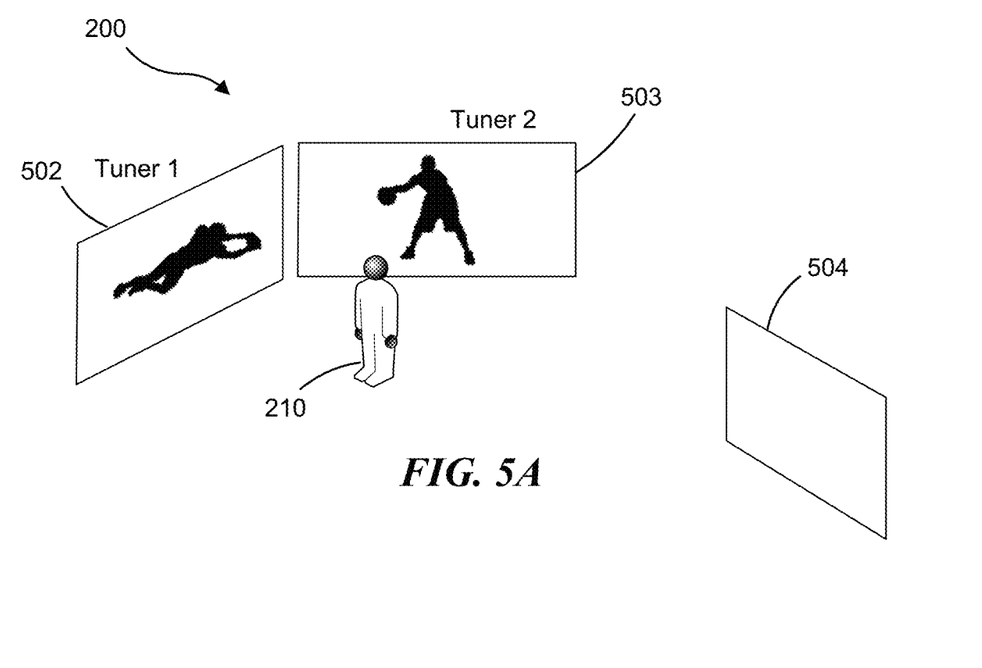
FIGS. 5A and 5B illustrate adaptively tuning a video tuner based on the which direction or virtual display a user is facing according to some embodiments of the disclosed technology.
Figure 5B:
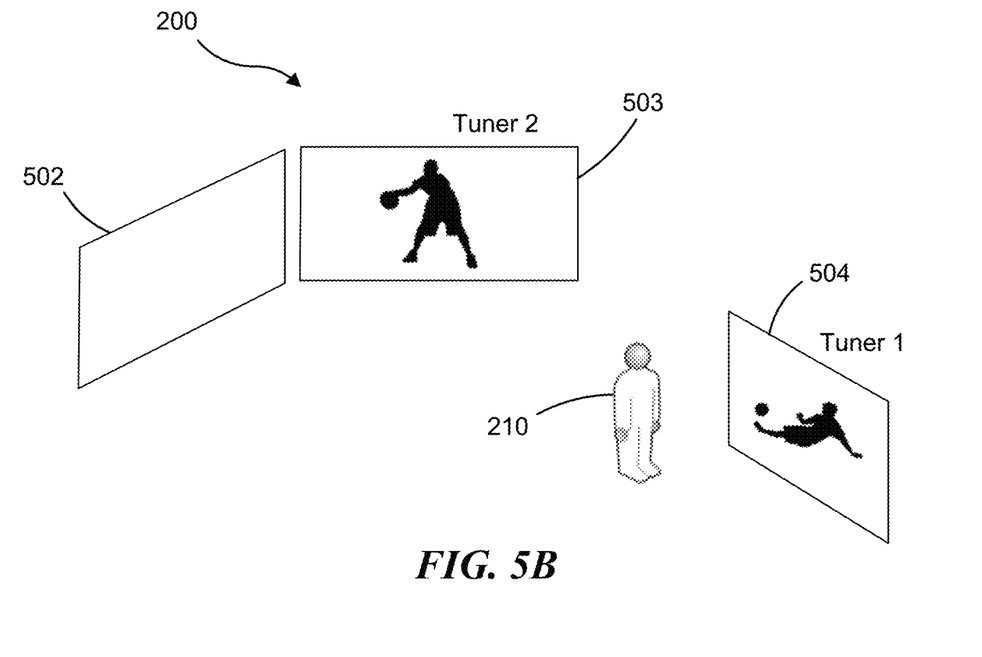

With reference to FIGS. 5A and 5B, in some embodiments, as the user moves their avatar 210 around and/or through the virtual sportsbook environment 200, the system can determine which direction the avatar 210 is facing and/or which virtual displays 502-504 they are viewing. In the depicted embodiment, there are two tuners and three displays 502-504. In other words, there are more available events (e.g., football, basketball, and soccer) than there are tuners. Based on the system's determination of which virtual display(s) the avatar is facing the system can retune one or more of the tuners to a different channel for display on that virtual display. In FIG. 5A, for example, the avatar 210 is facing towards virtual displays 502 and 503 and Tuners 1 and 2 are tuned to football and basketball, respectively. In FIG. 5B, the avatar has turned to view virtual display 504 and is no longer facing display 502. Accordingly, the system retunes Tuner 1 to a channel broadcasting soccer and displays it on the virtual display 504.

In some embodiments, the system can tune at least one of the one or more tuners to a first channel when a user moves their head or body to reorient the HMD in order to view a first virtual television and subsequently tuning the tuner to a second channel when the user moves the HMD to view a second virtual television. In some embodiments, the system can tune at least one of the one or more tuners to a first channel when a user moves the HMD to view a first direction in the virtual environment and subsequently tuning the tuner to a second channel when the user moves the HMD to view a second direction in the virtual environment. In some embodiments, the user can swipe with the avatar hand to swipe between different virtual displays.

Figure 6:
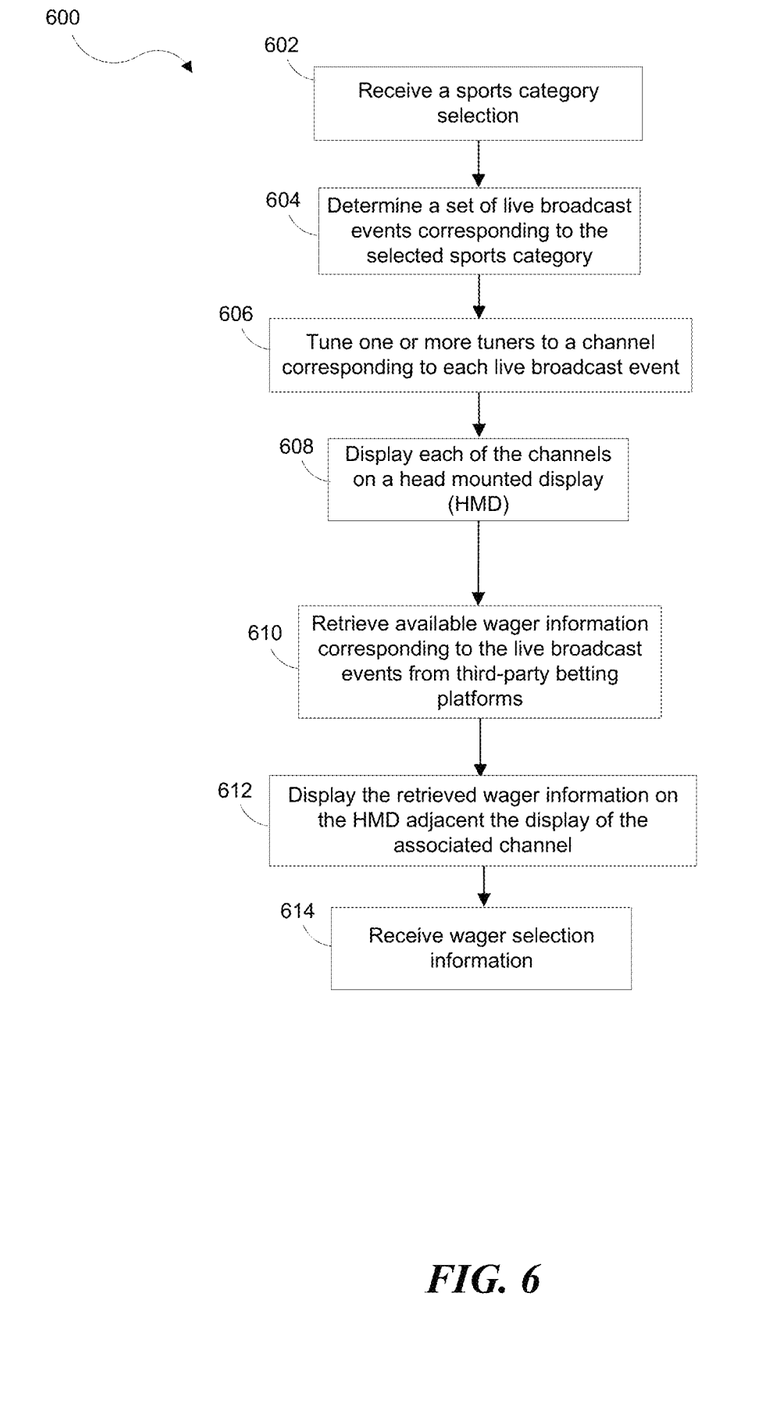
FIG. 6 illustrates an example method for displaying sports betting information in a virtual environment according to some embodiments of the disclosed technology.

FIG. 6 is a flow diagram showing a representative method of operation 600 of a processor-based system for automatically displaying sports events and associated betting information in a virtual environment according to some embodiments of the present technology. The method starts at 602, where a sports category selection is received. In some embodiments, receiving the sports category selection comprises a user entering a virtual room corresponding to the category. At step 604, the system determines a set of live broadcast events corresponding to the selected sports category and tunes one or more tuners to a channel corresponding to each live broadcast event at step 606. In some embodiments, step 606 can comprise receiving one or more data streams through a wireless network. In some embodiments, determining the set of live broadcast events comprises verifying the user's channel authorization. At step 608, each of the channels or data streams is displayed on a HMD (e.g., on virtual televisions in a virtual environment). The method can also include retrieving available wager information corresponding to each of the set of live broadcast events from one or more third-party betting platforms at step 610, and displaying the retrieved wager information on the HMD adjacent the display of the associated channel at step 612. In some embodiments, the method can include receiving wager selection information at step 614.

In some embodiments, the method can further comprise sending an instruction to output an audio signal for only the channel corresponding to the virtual television the user is currently viewing. In some embodiments, the method can further comprise tuning at least one of the one or more tuners to a first channel when a user moves their head to view a first virtual television and subsequently tuning the tuner to a second channel when the user moves their head to view a second virtual television. In some embodiments, the method can further comprise tuning at least one of the one or more tuners to a first channel when a user moves their head to view a first direction in the virtual environment and subsequently tuning the tuner to a second channel when the user moves their head to view a second direction in the virtual environment. In some embodiments, the method can further comprise prioritizing the displayed channels based on the received wager selection information. In some embodiments, retrieving the available wager information includes receiving available wager information from multiple third-party platforms and displaying the available wager information on the HMD for user comparison.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
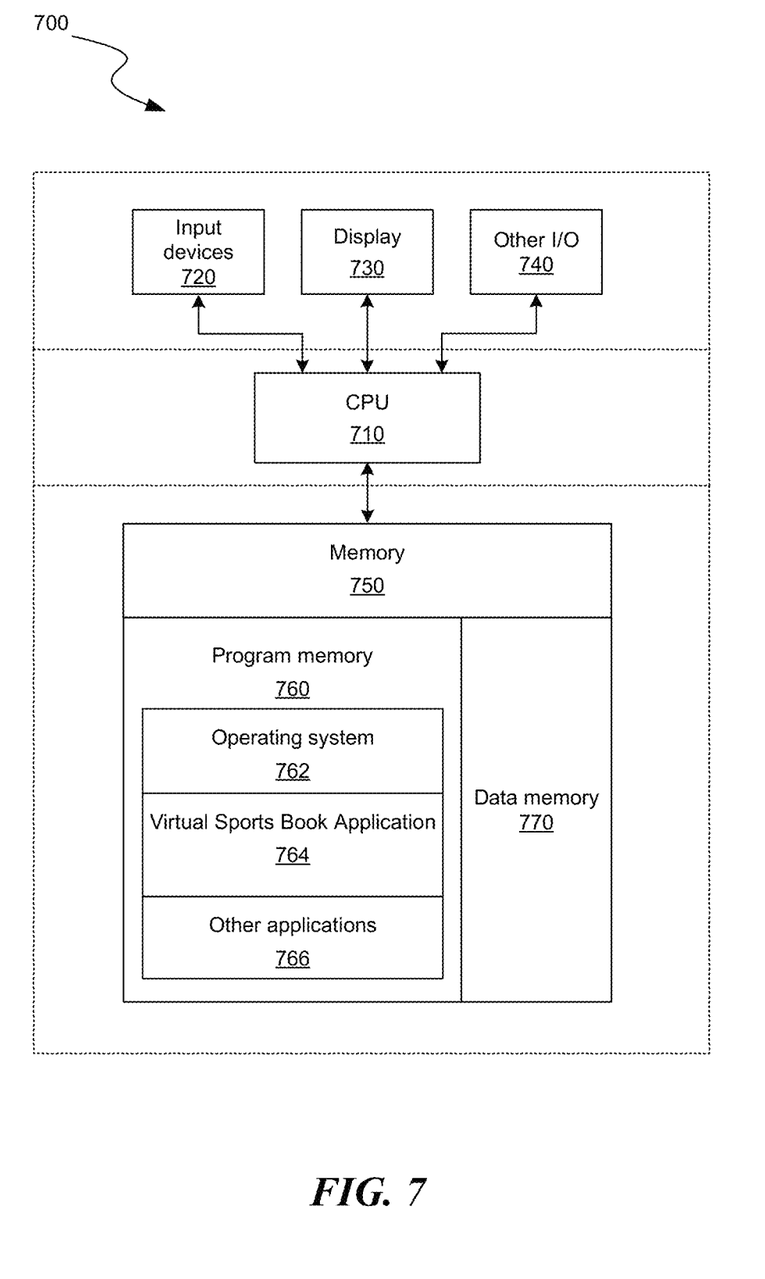
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 700 that determines a set of live broadcast events based on a sports category and displays them on a head mounted device. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, set-top-box remote, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented/virtual reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, virtual sports book application 764, and other application programs 766. Memory 750 can also include data memory 770 that can include broadcast schedule information and/or wager information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 8:
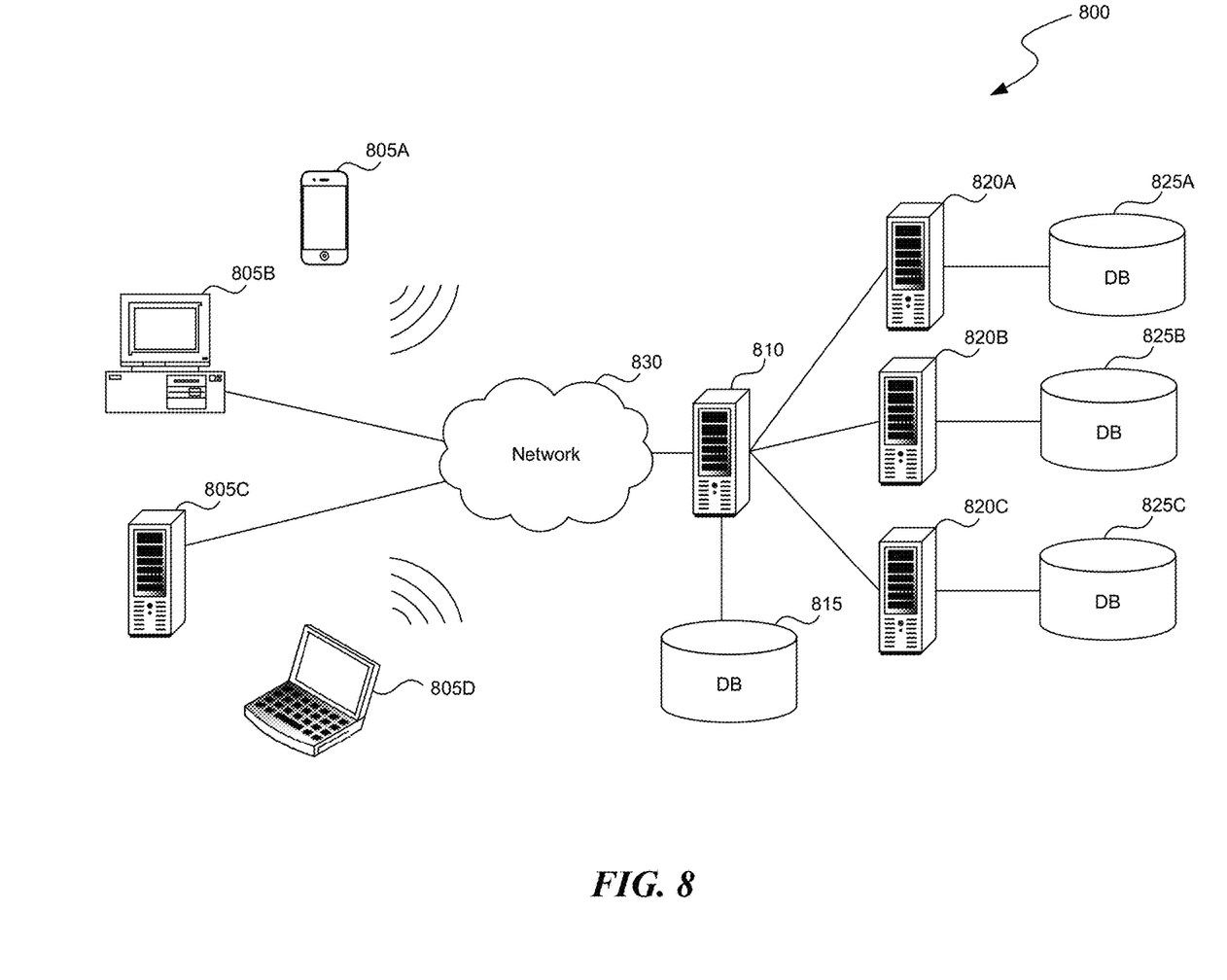
FIG. 8 is a block diagram illustrating an overview of an environment in which some implementations can operate.

FIG. 8 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information such as selected region information, a particular latitude and longitude location information, resulting risk scores, pricing/risk ratios, and/or user preferences. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 9:
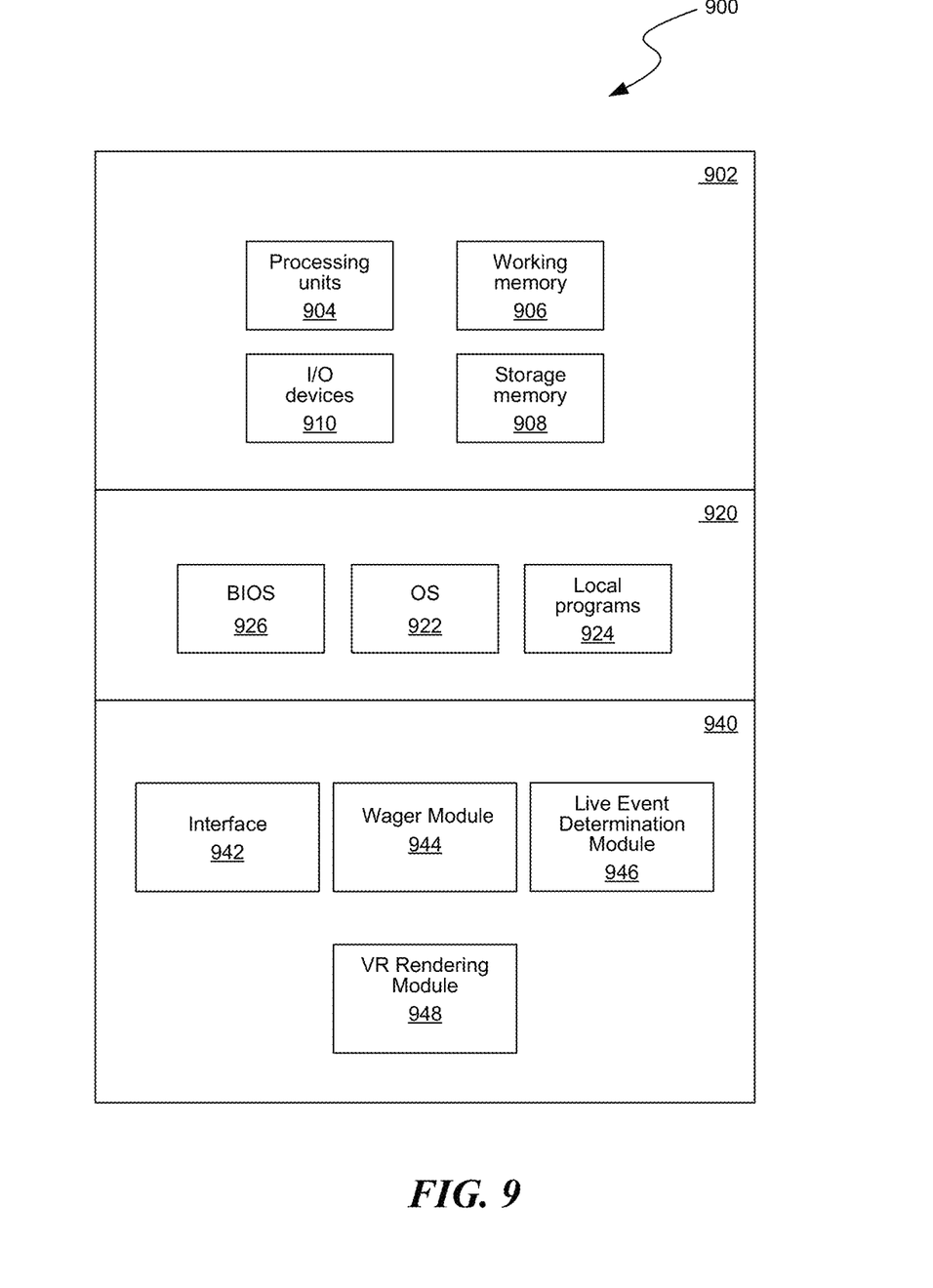
FIG. 9 is a block diagram illustrating components which, in some implementations, can be used in a system employing the disclosed technology.

FIG. 9 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include a Wager Module 944, Live Event Determination Module 946, Virtual Reality Rendering Module 948, and components that can be used for transferring data and controlling the specialized components, such as interface 942. In some implementations, components 900 can be in a computing system that is distributed across multiple computing devices or can be an interface to a server-based application executing one or more of specialized components 940.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A virtual sports betting system, comprising:
   one or more processors; and
   one or more memory devices having stored thereon instructions that when executed by the one or more processors cause the one or more processors to:
   receive a sports category selection;
   determine a set of live broadcast events corresponding to the selected sports category;
   receive one or more data streams corresponding to each live broadcast event;
   display each of the one or more data streams in a virtual environment on a head mounted display (HMD);
   detect a gaze direction of a user avatar within the virtual environment is towards a live broadcast event of the set of live broadcast events;
   in response to detecting the gaze direction, retrieve available wager information corresponding to the live broadcast event from one or more third-party betting platforms; and
   display the retrieved wager information on the HMD adjacent the display of the live broadcast event.

2. The system of claim 1, wherein each of the one or more data streams is displayed on a virtual television in the virtual environment.

3. The system of claim 2, further comprising instructions to output an audio signal for only a data stream corresponding to the virtual television a user is currently viewing.

4. The system of claim 1, further comprising one or more tuners and instructions to tune the one or more tuners to a channel corresponding to each live broadcast event.

5. The system of claim 4, further comprising instructions to tune at least one of the one or more tuners to a first channel when a user moves the HMD to view a first virtual television and subsequently tuning the one or more tuners to a second channel when the user moves the HMD to view a second virtual television.

6. The system of claim 4, further comprising instructions to tune at least one of the one or more tuners to a first channel when a user moves the HMD to view a first direction in the virtual environment and subsequently tuning the one or more tuners to a second channel when the user moves the HMD to view a second direction in the virtual environment.

7. The system of claim 1, wherein receiving the sports category selection comprises a user entering a virtual room corresponding to the category.

8. The system of claim 1, further comprising instructions to receive wager selection information.

9. The system of claim 8, further comprising instructions to prioritize the displayed one or more data streams based on the received wager selection information.

10. The system of claim 1, wherein retrieving the available wager information includes receiving the available wager information from multiple third-party platforms and displaying the available wager information on the HMD for user comparison.

11. A method for displaying sports betting information in a virtual environment, the method comprising:
    receiving a sports category selection;
    determining a set of live broadcast events corresponding to the selected sports category;
    receiving one or more data streams corresponding to each live broadcast event;
    displaying each of the one or more data streams in the virtual environment on a head mounted display (HMD);
    detecting a gaze direction of a user avatar within the virtual environment is towards a live broadcast event of the set of live broadcast events;
    in response to detecting the gaze direction, retrieving available wager information corresponding to the live broadcast event from one or more third-party betting platforms; and
    displaying the retrieved wager information on the HMD adjacent the display of the live broadcast event.

12. The method of claim 11, wherein each of the one or more data streams is displayed on a virtual television in the virtual environment.

13. The method of claim 12, further comprising sending an instruction to output an audio signal for only a data stream corresponding to the virtual television a user is currently viewing.

14. The method of claim 11, wherein the one or more data streams are received over a wireless connection.

15. The method of claim 11, wherein the one or more data streams are received via a set-top-box.

16. The method of claim 11, wherein receiving the sports category selection comprises a user entering a virtual room corresponding to the sports category.

17. The method of claim 16, wherein determining the set of live broadcast events comprises verifying an authorization of the user to view the corresponding data stream.

18. The method of claim 11, further comprising receiving wager selection information.

19. The method of claim 18, further comprising prioritizing the displayed one or more data streams based on the received wager selection information.

20. The method of claim 11, wherein retrieving the available wager information includes receiving the available wager information from multiple third-party platforms and displaying the available wager information on the HMD for user comparison.

\* \* \* \* \*